(Model.)
L. SCHUTTE.
INJECTOR.
No. 377,912. Patented Feb. 14, 1888.
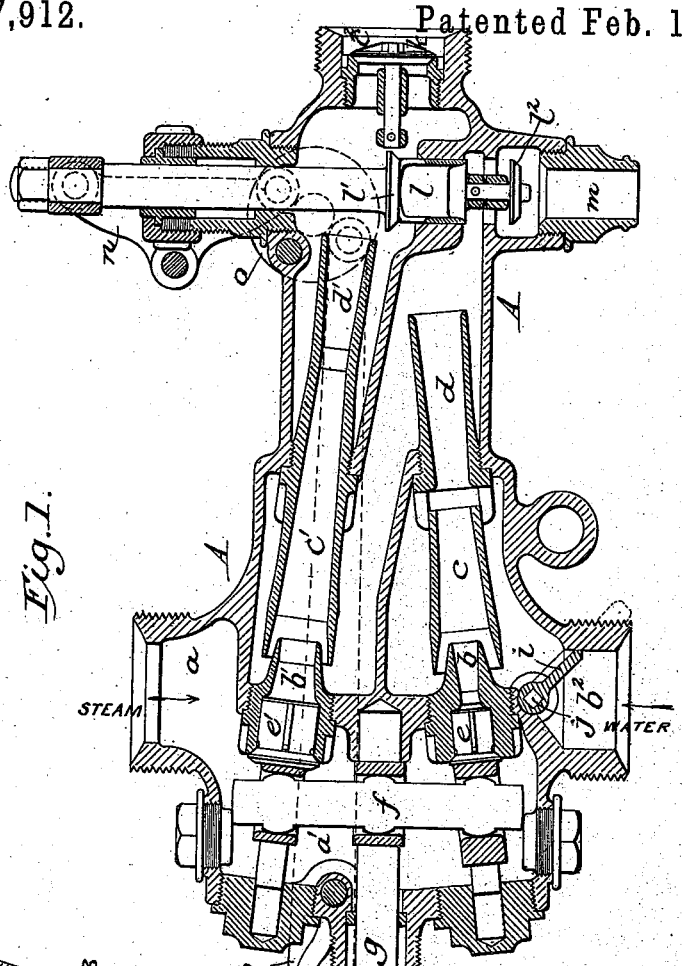
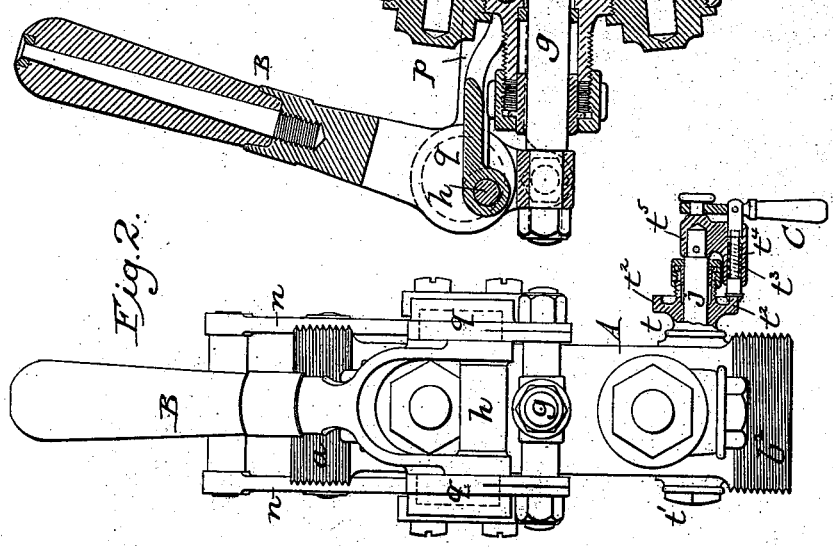
WITNESSES
INVENTOR
Louis Schutte,
By P. Y. Dodge,
Atty.

UNITED STATES PATENT OFFICE.

LOUIS SCHUTTE, OF PHILADELPHIA, PENNSYLVANIA.

INJECTOR.

SPECIFICATION forming part of Letters Patent No. 377,912, dated February 14, 1888.

Application filed October 28, 1887. Serial No. 253,617. (Model.)

*To all whom it may concern:*

Be it known that I, LOUIS SCHUTTE, of Philadelphia, in the county of Philadelphia and State of Pennsylvania, have invented certain Improvements in Injectors, of which the following is a specification.

The present invention has reference to that class of steam-injectors in which two nozzles or series of nozzles are arranged side by side in such manner that the fluids discharged from the first are returned and delivered through the second, and is intended more particularly as an improvement on the apparatus represented in Letters Patent granted to me on the 8th day of March, 1881, No. 238,612, wherein the valves controlling the admission of steam to the respective nozzles are connected through intermediate devices with a single controlling-lever.

The aims of the present invention are, first, to adapt the water-chambers to drain themselves completely at all times, in order to facilitate the starting of the apparatus and to enable the same to lift the water to a greater height; second, to render the water-passages of a more uniform area and of smaller size in cross-section, in order to maintain a higher speed in the movement of the water, and a consequent prevention of the loss of power which heretofore resulted from a change of speed into pressure and pressure into speed again; and, third, to secure a more uniform wear of the parts and a more perfect seating of the starting-valve. In order to accomplish these results I arrange the two nozzles or series of nozzles in lines converging toward the discharge or delivery end of the injector, instead of in parallel lines, as heretofore, and I arrange the starting-valve in a vertical instead of a horizontal position. I also provide suitable connections between the lever which operates the starting-valve and the overflow-valve, as hereinafter explained.

In the accompanying drawings, Figure 1 represents a central axial section through my improved injector. Fig. 2 is an end elevation of the same.

Referring to the drawings, A represents the body of the apparatus commonly cast complete in one piece with a steam-admission throat, $a$, and a water-admission throat, $b^2$, on opposite sides near one end, and with a delivery-throat, $c^2$, at the opposite end. The steam entering the chamber $a'$ at one end of the apparatus escapes thence through the steam-nozzles $b$ and $b'$, lying side by side. The nozzle $b$ is projected slightly into the open end of and delivers its steam longitudinally through the contracted combining tube or nozzle $c$, which is joined to and delivers into the smaller end of the discharge-nozzle $d$ in the manner customary in this class of apparatus. The nozzle $b'$ delivers in like manner into the combining-tube $c'$, which discharges through the delivery-tube $d'$. The fluids discharged from the nozzle $d$ return, as usual, through a passage in the body to the forward end of the second nozzle $c'$, through which and the nozzle $d'$ they pass to the point of discharge.

Heretofore it has been customary in this particular type of apparatus to arrange the two series of nozzles with their axes in parallel lines. In my apparatus the axes of the two series of nozzles converge toward the delivery end, as plainly represented in Fig. 1, the effect of this arrangement being to bring the nozzles nearer together at the delivery than at the receiving end. This arrangement enables me to reduce the size of the body in cross-section at the delivery end, thereby lessening its sectional area and causing the currents therein to maintain their velocity as they approach the point of delivery.

In apparatus having parallel nozzles the fluid-passages are of increased area between the first and second nozzles, the result of which is that the fluids, expanding during the course of their passage, lose their velocity before entering the second nozzle, resulting in a loss of energy, a waste of steam, and a diminished lifting effect on the part of the apparatus.

The delivery of the steam to the nozzles $b\ b'$ is controlled by the usual valves $e$ and $e'$, connected, by a cross-bar or lever, $f$, to the longitudinal spindle $g$, which is projected through a stuffing-box to the outside of the body and there united by a swivel coupling to the hand-lever B, pivoted to the body of the injector at $h$. These devices are essentially the same as those in my former patent. The admission of water through the throat $b^2$ is controlled by means of a vibratory valve, $i$, mounted on a rock-shaft, $j$, which is extended through a suitable gland or stuffing-box to the exterior of the body, and there provided with an operating-handle, C, the details of which will be hereinafter described.

The delivery-throat $c^2$ is provided, as usual, with a check-valve, $k$, opening in an outward direction. For the purpose of initiating the operation of the apparatus, I provide the starting or overflow valve $l$, through which direct communication may be established between the delivery-nozzle $d'$ and the overflow-pipe $m$. This is, it will be observed, a double valve having the portion $l'$ to control the discharge from the nozzle $d'$, and the portion $l^2$ to control the discharge from the nozzle $d$. When the valve is open, communication is established directly from the nozzle $d$ as well as from the nozzle $d'$ to the overflow $m$. This starting-valve $l$, I arrange in a vertical position extending its stem or spindle upward through a gland at the top of the body, and connected by side bars, $n$, to an elbow-lever, $o$, which is in turn connected by side bars, $p$, to eccentrics $q$, formed on the sides of the main lever B. The arrangement is such that the movement of the lever B to open the steam-admission valves $e$ and $e'$, will at the same time open the overflow or starting valve $l$, and thus permit the apparatus to commence its action. A continued movement of the lever B to fully open the steam-valves causes the closing of the overflow-valve, so that the delivery is effected wholly through the valve $k$.

In practice I find that by arranging the overflow or starting valve in a vertical position its wear and the wear of its seat are rendered uniform, so that the valve will at all times seat itself tightly, a result which cannot be secured with a valve arranged in a horizontal position.

Referring again to the throttle-valve $i$, it will be observed that its operating-spindle $j$ is seated at its ends in plates $t$ and $t'$, screwed into openings formed in the sides of the body. These plates are interchangeable, so that the spindle may be reversed or turned end for end to bring the operating-lever on the right or the left side of the apparatus as its location may render desirable.

For the purpose of locking the throttle-valve in its different adjustments, I provide the plate $t$ with a notched flange, $t^2$, and connect to the lever a dog, $t^3$, actuated by a spring, $t^4$, and arranged to engage the flange, as shown. The lever is jointed loosely to a cap, $t^5$, on the end of the spindle, so that by moving it laterally it will effect the disengagement of the dog.

Having thus described my invention, what I claim is—

1. In a duplex injector in which the fluids discharged from the first nozzle are returned and delivered to the second nozzle, the body diminishing in size toward the delivery end, in combination with the two nozzles arranged therein side by side in lines converging toward the delivery end, whereby the velocity of the fluids discharged from the first nozzle is maintained during their passage therefrom to the second nozzle.

2. In a duplex injector, the converging nozzles arranged side by side in lines converging toward the delivery end, in combination with the inclosing-body reduced in size internally toward its delivery end, and provided with the passage for returning the fluids from the delivery end of one nozzle to the receiving end of the other.

3. In an injector, the lever B, controlling the steam admission, in combination with the eccentrics thereon, the connecting-bar $p$, the lever $o$, the link $n$, and overflow-valve $l$.

4. In a duplex injector having substantially horizontal nozzles and the inclosing-body, the vertically-reciprocating starting-valves $l'$ $l^2$.

In testimony whereof I hereunto set my hand, this 12th day of October, 1887, in the presence of two attesting witnesses.

LOUIS SCHUTTE.

Witnesses:
　DANIEL HILDRETH,
　FRANK SPILLIN.